(No Model.) 2 Sheets—Sheet 1.
J. F. BICKEL.
VEHICLE SPRING.
No. 553,201. Patented Jan. 14, 1896.
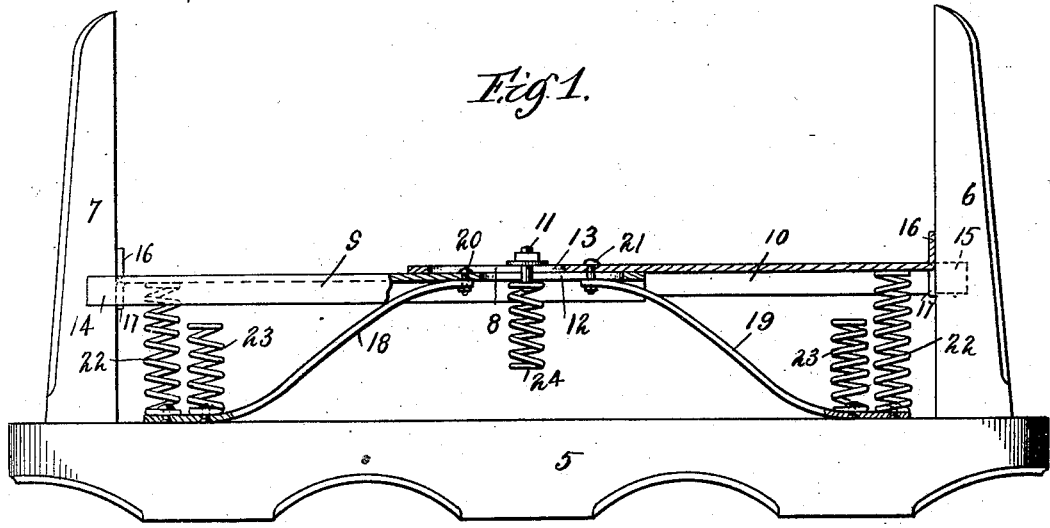
Fig. 1.
Fig. 2.
Fig. 4.
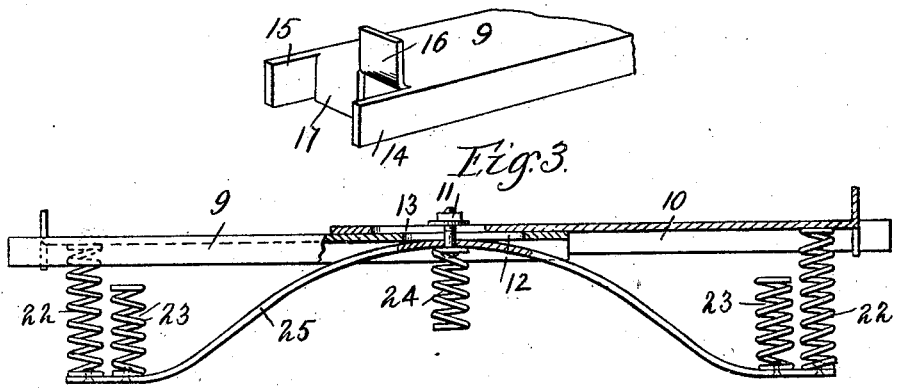
Fig. 3.
Witnesses.
Wm. M. Rheem.
Wm. F. Henning.
Inventor.
John F. Bickel,
by Bond, Adams, Pickard and Jackson,
Attys.
ANDREW B. GRAHAM. PHOTO-LITHO. WASHINGTON, D.C.

(No Model.) 2 Sheets—Sheet 2.

J. F. BICKEL.
VEHICLE SPRING.

No. 553,201. Patented Jan. 14, 1896.

Witnesses.
Wm. M. Rheem.
Wm. F. Henning.

Inventor
John F. Bickel,
by Bond, Adams, Pickard & Jackson
Atty's

ANDREW B. GRAHAM, PHOTO-LITHO, WASHINGTON, D.C.

UNITED STATES PATENT OFFICE.

JOHN F. BICKEL, OF RACINE, WISCONSIN, ASSIGNOR TO CORA M. BICKEL, OF SAME PLACE.

VEHICLE-SPRING.

SPECIFICATION forming part of Letters Patent No. 553,201, dated January 14, 1896.

Application filed December 26, 1894. Serial No. 533,032. (No model.)

*To all whom it may concern:*

Be it known that I, JOHN F. BICKEL, a citizen of the United States, residing at Racine, in the county of Racine and State of Wisconsin, have invented certain new and useful Improvements in Vehicle-Springs, of which the following is a specification, reference being had to the accompanying drawings, in which—

Figure 5:
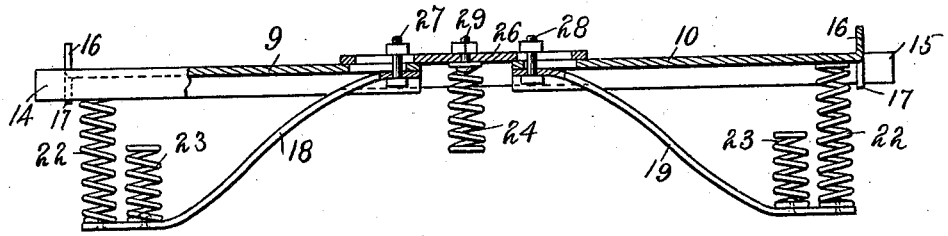
Figure 6:
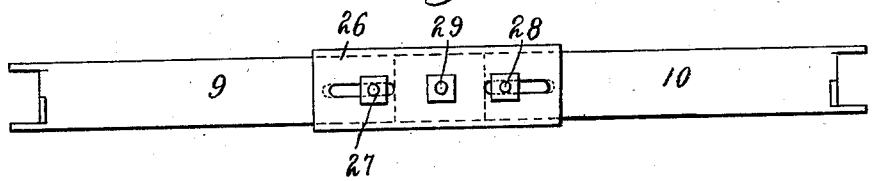
Figure 7:
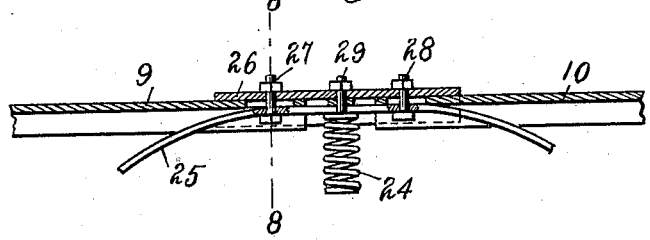
Figure 8:
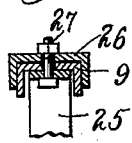
Figure 9:

Figure 1 is an elevation, partly in section, of a bolster-spring and bolster, showing one form of the extensible bar. Fig. 2 is a plan view of the same. Fig. 3 is a view showing one form of my improved bar in connection with a semielliptic spring. Fig. 4 is a perspective view of one end of one of the bar-sections. Fig. 5 is a sectional view of the bolster-spring, showing another form of the extensible bar. Fig. 6 is a plan view of the same. Fig. 7 is a longitudinal sectional view showing the second form of bar in connection with a semielliptic spring. Fig. 8 is a section on line 8 8 of Fig. 7. Fig. 9 is a vertical cross-section of the bar and one of the semielliptic or quarter-elliptic springs.

My invention relates to vehicle-springs, and has particularly to do with springs of the class commonly known as "bolster-springs," such springs being arranged to rest upon the bolsters of a wagon. Heretofore it has been common to provide bolster-springs with short auxiliary spiral springs in addition to the usual spiral springs, such short spiral springs being arranged to be normally idle and to come into play when the weight of the load exceeded a certain amount. In the constructions heretofore used such auxiliary springs have been connected to a bar arranged over the bolster and movable vertically under the weight of the load, so that such auxiliary springs under certain conditions would be moved downward sufficiently to bring them into engagement with the bolster or some other device so as to bring them into action. The full-length spiral springs were mounted upon the ends of the semielliptic springs. By such arrangement of the auxiliary springs the springs of each pair were caused to approach or recede from each other, inasmuch as the full-length spiral springs were caused to move laterally when the semielliptic springs were compressed, owing to the straightening of such semielliptic springs. The movement of the spiral and auxiliary springs toward and from each other thus produced is objectionable, and it is one of the objects of my invention to provide an improved construction by which such movement of such springs will be avoided.

Another object of my invention is to provide an improved extensible bar for supporting the wagon-bed, which bar will be so constructed that it may be readily adapted for use with wagon-beds of different widths.

It is my object also to provide certain other improvements, which will be more specifically hereinafter pointed out.

That which I regard as new will be set forth in the claims.

In the drawings, 5 indicates a wagon-bolster, and 6 7 indicate the usual standards rising therefrom.

8 indicates a bar which supports the wagon-bed, which bar consists of sections 9 10 connected to and movable longitudinally of each other. The bar-sections 9 10 are made of channeled iron, and in the form shown in Figs. 1, 2 and 3 one of the bar-sections, as 9, is contracted to adapt it to fit within the inner end of the bar-section 10.

11 indicates a bolt which passes through slots 12 13 in the bar-sections 9 10, respectively, as shown in Fig. 1, which bolt serves to hold the bar-sections together. The ends of the bar-sections 9 10 are provided with horizontal ears 14 15 and vertical ears 16 17, the ears 14 15 being adapted to straddle the standards 6 7 and the ears 16 17 to bear against the inner faces of such standards, thereby causing the bar 8 to have a steady action. The ears 14 15 16 17 are formed by slitting the ends of said bar-sections along their edges and along the central line and bending the parts thus formed into the proper position, as shown in Fig. 4.

18 19 indicate quarter-elliptic springs, the upper ends of which are connected to the bar 8 by bolts 20 21, as shown in Fig. 1. The bolt 20 passes through the slot 13 in order to permit of the longitudinal movement of the bar-section 10, and the bolt 21 passes through the slot 12 to permit of the longitudinal movement of the bar-section 9. In order to strengthen the bar-sections 9 10 and also to more firmly secure the springs 18 19 to said bar-sections, said bar-sections are channeled at the center, as shown in Fig. 9, so that the springs 18 19 fit closely into place and are prevented from moving laterally. The rib in the bar-sections 9 10 thus formed serves to materially increase the strength of said bar-sections.

The lower ends of the springs 18 19 rest upon the opposite ends of the bolster 5, as shown in Fig. 1, and each of such springs carries a spiral spring 22 and a short auxiliary spring 23. The upper ends of the springs 22 bear against the under sides of the bar-sections 9 10, as shown in Fig. 1, as do also the auxiliary springs when the bar 8 is depressed sufficiently. This construction has been found to be very satisfactory, for the reason that when said bar is depressed the lower ends of the quarter-elliptic springs 18 19 are caused to separate, and consequently the upper ends of the springs 22 23, which bear against the bar-sections 9 10, are free to move longitudinally of such bar-sections to a greater or less extent, so that they do not become tilted or otherwise disarranged, as would be the case should they be confined by sockets at their upper ends, as in the constructions heretofore used. Furthermore, this construction prevents the springs 22 and the auxiliary springs 23 from interfering with each other, as might be the case should the springs of each pair have a lateral movement relative to each other.

24 indicates a spiral spring which is connected to the bolt 11 at the center of the bar 8, and is arranged to engage the bolster 5 when the bar 8 is depressed to a certain extent.

In Fig. 3 I have shown the use of the above-described form of my extensible bar in connection with a semielliptic spring 25, the arrangement being in other respects the same. My improved quarter-elliptic springs are the best, however, and I prefer to use such construction.

It will be seen from the above description that by loosening the bolts 11 20 21 the bar-sections 9 10 may be readily adjusted with relation to each other for the purpose of fitting them for wagon-beds of different widths, and that when so adjusted the springs 18 19 will adapt themselves to the new position of said bar-sections.

In Figs. 5, 6, 7, and 8 I have shown another form of my improved extensible bar. It will be observed that in the form hereinbefore described the bar-sections are connected directly to each other. In the form shown in Fig. 5, however, the bar-sections 9 10 are connected by an intermediate bar 26 by means of bolts 27 28. The bar 26 is provided with slots to receive the bolts 27 28, so that the position of said bolts may be adjusted. The quarter-elliptic springs 18 19 are connected to the bar-sections by the bolts 27 28. The central auxiliary spring, 24, is connected to the intermediate bar by a bolt 29. In other respects the arrangement of the springs is the same as that above described. In Fig. 7 I have shown the use of the latter form of bar in connection with the semielliptic spring 25. When said semielliptic spring 25 is used, the central auxiliary spring, 24, is connected to it instead of to the bar 26, as shown.

I prefer the form of bar last described, inasmuch as a greater amount of adjustment is secured by its use. Furthermore, an important advantage arising from such construction is that bar-sections 9 10 of the same length may be used for springs intended for wagon-beds of any width, an intermediate bar of sufficient length being used to make the spring fit the wagon. The importance of this arrangement will be apparent when it is understood that ordinarily a given bolster-spring is designed to be adjusted only to a limited extent, and therefore in cases of wagon-beds of vastly different widths it would, with the constructions heretofore used, be necessary to provide an entirely new bolster-spring. By my construction, however, it is only necessary to have intermediate pieces of suitable lengths in order that the spring may be at once adjusted to fit the wagon desired.

That which I claim as my invention, and desire to secure by Letters Patent, is—

1. In a bolster spring, the combination with a bar consisting of sections longitudinally adjustable with relation to each other, means for securing said sections together, part elliptic springs connected to said adjustable bar, spiral springs 22 carried by said part elliptic springs and connected with said adjustable bar, and auxiliary spiral springs carried by said part elliptic springs and in juxtaposition to the spiral springs 22 and disconnected from the adjustable bar, substantially as described.

2. In a bolster spring, the combination with a bar consisting of sections longitudinally movable with relation to each other, an intermediate bar connecting said sections, spiral springs, carried by said intermediate bar, quarter elliptic springs connected respectively to the sections of said bar, spiral springs 22 carried by said quarter elliptic springs and connected with said bar, auxiliary spiral springs 23 carried by said quarter elliptic springs in juxtaposition to the spiral springs 22 and disconnected from said bar, substantially as described.

JOHN F. BICKEL.

Witnesses:
HENRY NORMAN,
CHARLES BEECHER.